United States Patent
Boisseau et al.

(10) Patent No.: US 9,550,504 B2
(45) Date of Patent: Jan. 24, 2017

(54) RAIL VEHICLE BRAKING SYSTEM AND BRAKING METHOD FOR A RAIL VEHICLE COMPRISING SUCH A SYSTEM

(71) Applicant: FAIVELEY TRANSPORT AMIENS, Amiens (FR)

(72) Inventors: Gilles Boisseau, Amiens (FR); Claudino Goncalves, Ribeaucourt (FR)

(73) Assignee: FAIVELEY TRANSPORT AMIENS, Amiens (FR)

( * ) Notice: Subject to any disclaimer, the term of this patent is extended or adjusted under 35 U.S.C. 154(b) by 7 days.

(21) Appl. No.: 14/572,085

(22) Filed: Dec. 16, 2014

(65) Prior Publication Data
US 2016/0167683 A1 Jun. 16, 2016

(51) Int. Cl.
| B61H 13/00 | (2006.01) |
| B61H 5/00 | (2006.01) |
| B61H 13/20 | (2006.01) |
| F16D 55/224 | (2006.01) |
| F16D 65/18 | (2006.01) |
| F16D 121/08 | (2012.01) |
| F16D 127/06 | (2012.01) |

(52) U.S. Cl.
CPC ............. B61H 13/00 (2013.01); B61H 5/00 (2013.01); B61H 13/20 (2013.01); F16D 55/2245 (2013.01); F16D 65/183 (2013.01); *F16D 2121/08* (2013.01); *F16D 2127/06* (2013.01)

(58) Field of Classification Search
CPC .......... B61H 5/00; B61H 13/00; B61H 13/005
USPC ... 188/166, 170, 265; 303/3, 9.76, 127, 128, 303/89
See application file for complete search history.

(56) References Cited

U.S. PATENT DOCUMENTS

| 1,213,363 A * | 1/1917 | Henry ..................... B60T 17/16 188/196 B |
| 4,007,815 A * | 2/1977 | Acre ........................ B60T 17/16 188/265 |
| 4,685,744 A * | 8/1987 | Luce ........................ B60T 13/36 188/265 |
| 5,701,974 A | 12/1997 | Kanjo et al. |

(Continued)

FOREIGN PATENT DOCUMENTS

| EP | 2 154 040 A1 | 2/2010 | |
| EP | 2 154 391 A1 | 2/2010 | |
| GB | 1280725 A * | 7/1972 | .............. B60T 17/20 |

OTHER PUBLICATIONS

FR Search Report, dated Mar. 5, 2014, from corresponding 1357025 application.

*Primary Examiner* — Thomas J Williams
(74) *Attorney, Agent, or Firm* — Young & Thompson (57) ABSTRACT

A rail vehicle braking system includes a service brake (6) having a movable piston (8) delimiting with a body (2) of the system a service brake chamber (13) supplied by a first source, and a parking brake (7) having a blocking device (20) having a position in which it immobilizes the piston in a position, and a movable actuating device (23, 24) delimiting with the body a parking brake chamber (25) supplied by a second source and having a stable position in which it holds the blocking device in its position; the service chamber, when the actuating device is in its stable position, being supplied by the second source of which the pressure is greater than that of the first source in order to apply a greater braking force than the force applied when the piston is in its position.

16 Claims, 4 Drawing Sheets

(56) References Cited

U.S. PATENT DOCUMENTS

2016/0167684 A1\* 6/2016 Gerber-Papin ......... B61H 13/00
                                                    188/60

\* cited by examiner

RAIL VEHICLE BRAKING SYSTEM AND BRAKING METHOD FOR A RAIL VEHICLE COMPRISING SUCH A SYSTEM

BACKGROUND OF THE INVENTION

The invention concerns the field of rail vehicle brakes.

It more particularly concerns the rail vehicle braking systems provided with a service brake and with a parking brake configured to act on a braking linkage.

It also concerns the braking methods for rail vehicles comprising such braking systems.

DESCRIPTION OF THE RELATED ART

Rail vehicles are generally equipped with service brake cylinders comprising a piston movable under the effect of a fluid under pressure, the movement of that piston driving a braking action such as the clamping of a disk brake between two linings, or the direct pressure of a block against a vehicle wheel.

These brake cylinders also generally comprise a parking or emergency actuator which is actuated in case of pressure loss of the fluid under pressure and/or in case of intentional venting or leakage of the pneumatic system. This actuator, also termed parking brake, makes it possible to provide braking by virtue of the load of a spring substituting for the load of the fluid. Once this parking brake has been activated, the brake remains continuously engaged.

A rail vehicle braking system is known from European patent application EP 2 154 040 which is provided with a parking brake actuator coupled to a rail service brake cylinder. This brake cylinder comprises a body and a piston which is movable relative to the body to act on the braking linkage via a thrust rod.

The brake cylinder also comprises a pressure chamber delimited by the piston and by the body and which is connected by a pipe to a source of pneumatic pressure agent to put the piston into a service braking position.

The parking brake comprises a body which is distinct from the brake cylinder body. The body of the parking brake has an opening facing the piston of the service brake cylinder, which opening slidingly receives a thrust sleeve fitting into that opening in a fluid-tight manner.

The parking brake also comprises a piston movably mounted in a cylinder attached to the body and delimiting with that body a parking brake pressure chamber. This parking brake pressure chamber is connected to another source of pneumatic pressure agent via a pipe. The piston comprises at its center an aperture passed through by the thrust sleeve.

The parking brake further comprises springs which continuously bias the piston of that parking brake towards a position referred to as low in which the parking brake is considered as being in a working configuration.

To actuate the parking brake when the piston of the service brake cylinder is in service braking position, the pressure chamber of the parking brake (filled in advance with the pneumatic pressure agent) is vented and the springs of the parking brake then act on the piston of the parking brake, which drives the sleeve until the latter comes to bear against the piston of the service brake cylinder.

The pressure chamber of the service brake cylinder may then be vented since the parking brake has been actuated.

The load applied by the parking brake on the service brake piston is directly related to the load produced by the springs. This load naturally depends on the stiffness and the extension of those springs.

With this braking system, the force applied on the braking linkage by the piston of the service brake cylinder when the parking brake has been actuated and the service brake cylinder has been vented is often less than the force applied by that same piston when it is in service braking position.

SUMMARY OF THE INVENTION

The invention concerns a rail vehicle braking system, having improved performance relative to the braking systems of the above-mentioned prior art, while being simple, convenient and economic.

According to a first aspect, the invention thus relates to a rail vehicle braking system with brakes that have at least one lining or at least one block, comprising:

a body;

a braking linkage configured to act on at least one said brake that has at least one lining or at least one block;

a service brake comprising a braking piston which is movable relative to said body to act on said braking linkage and delimits with said body a service brake pressure chamber configured to be supplied by a first source of pneumatic pressure agent to put said braking piston into a service braking position; and a parking brake configured to act on said braking piston of said service brake and having a working configuration and a resting configuration;

said rail vehicle braking system being characterized in that said parking brake comprises:

a blocking device which is movable relative to said body to act on said braking piston and having a first position and a second position in which said blocking device is configured to immobilize said braking piston in service braking position, said parking brake then being in working configuration;

an actuating device movable relative to said body, delimiting with said body a parking brake pressure chamber configured to be supplied by a second source of pneumatic pressure agent, and having a stable position in which said actuating device is configured to hold said blocking device in its second position;

said rail vehicle braking system being configured such that, when said actuating device is in its stable position, said service brake pressure chamber is supplied by said second source of pneumatic pressure agent, of which the pressure is greater than that of said first source of pneumatic pressure agent, in order to apply, when said parking brake is in working configuration, a greater braking force than the braking force applied when said braking piston is in its service braking position and said parking brake is in its resting configuration.

In the braking system according to the invention, the braking piston is immobilized in service braking position by the parking brake and in particular by its blocking device. This means that the braking piston may be immobilized in any position, which position is linked to the travel which that piston has travelled and that travel depends on the force applied in the service braking phase.

By the term immobilize is meant the fact that the force applied by the braking piston on the braking linkage in the working configuration of the parking brake does not reduce, or almost not.

A certain loss is however accepted linked to the retraction of the braking piston, in particular on the slight movement of the piston relative to the blocking device, at the time the service brake pressure chamber is vented. This loss is controlled and is defined by a very slight reduction in the force applied which is due in particular to the manufacturing tolerances both of the blocking device and of the braking piston. This reduction in the force applied on the braking linkage is here called losses on retraction. An acceptable value for these losses on retraction is at maximum of the order of 10% of the force applied by the service brake at the time the parking brake is actuated to be in working configuration.

Thanks to the invention and in particular to the configuration of the braking piston and of the parking brake, the springs of the known braking systems described above are in particular dispensed with which make it possible to apply the parking brake force on the braking linkage via the service brake cylinder piston. Thus, for the same force applied on the braking linkage when the parking brake is in working configuration, the braking system according to the invention is more compact than the aforementioned braking systems of the prior art, and also lighter.

It should be noted that the braking linkage advantageously has deformable arms of which the elasticity may substitute for that of the springs of the known braking systems described above.

It should be noted that the configuration of the parking brake is chosen such that the load applied directly by the blocking device to immobilize the braking piston is not greater than the load applied by the springs on the piston of the aforementioned braking systems of the prior art; while the force applied on the braking linkage when the parking brake of the system according to the invention is in working configuration is at least equal to or even greater than that procured by the aforementioned braking systems of the prior art.

By virtue of its configuration, the braking system according to the invention furthermore makes it possible to momentarily supply the service brake pressure chamber with the second source of pneumatic pressure agent in order to increase the braking force applied to the braking linkage by the service brake piston.

It should be noted that the second source of pneumatic pressure agent initially supplies the parking brake pressure chamber.

Therefore, the braking force applied to the braking linkage when the parking brake is in its working configuration is increased further by it.

The system according to the invention thus makes it possible to obtain service brake and parking brake braking forces greater than those obtained with the aforementioned braking systems of the prior art, simply, conveniently and economically.

According to preferred, simple, convenient and economical features of the system according to the invention:

said system comprises at least one pneumatic distribution device configured to be supplied by said second source of pneumatic pressure agent and to be connected to said parking brake pressure chamber in order to put said parking brake respectively in its resting configuration when it is supplied by said second source of pneumatic pressure agent and in its working configuration when it is not supplied by said second source of pneumatic pressure agent;

said at least one pneumatic distribution device is configured to be connected to said service brake pressure chamber in order to supply said service brake with said second source of pneumatic pressure agent;

said system comprises a diverting valve configured to be connected to said first source of pneumatic pressure agent, to said second source of pneumatic pressure agent and to said service brake pressure chamber for its supply;

said pneumatic distribution device is in fluidic communication with said diverting valve for the supply of said service brake pressure chamber;

said pneumatic distribution device is provided with a threshold valve configured to control and actuate the passage from a first state of said pneumatic distribution device to a second state of said pneumatic distribution device;

said pneumatic distribution device is formed by a distributor provided with four apertures and a slide with two positions;

said slide with two positions has, in a first position, a first supply inlet configured to be connected to said second source of pneumatic pressure agent, a first parking brake outlet in fluidic communication with said first supply inlet and configured to be connected to said parking brake pressure chamber, a first service brake outlet configured to be connected to said service brake pressure chamber and a first exhaust outlet in fluidic communication with said first service brake outlet and opening to the atmosphere; and in a second position, a second supply inlet configured to be connected to said second source of pneumatic pressure agent, a second service brake outlet in fluidic communication with said second supply inlet and configured to be connected to said service brake pressure chamber, a second parking brake outlet configured to be connected to said parking brake pressure chamber and a second exhaust outlet in fluidic communication with said second parking brake outlet and opening to the atmosphere;

said system comprises a diverting valve provided with a first aperture configured to be connected to said first source of pneumatic pressure agent, a second aperture configured to be connected, in said first position of said slide, to said first service brake outlet, and in said second position of said slide, to said second service brake outlet, and a third aperture configured to be connected to said service brake pressure chamber; said diverting valve comprising a movable valve member configured to have a first position in which said first aperture is in in fluidic communication with said third aperture and a second position in which said second aperture is in fluidic communication with said third aperture;

said pneumatic distribution device is formed by a first distributor and by a second distributor each provided with three apertures and with a slide having two positions;

said slide of said first distributor has, in a first position, a first supply inlet configured to be connected to said second source of pneumatic pressure agent, a first parking brake outlet in fluidic communication with said first supply inlet and configured to be connected to said parking brake pressure chamber, and a blocked first service brake outlet configured to be connected to said service brake pressure chamber and to block the passage of air; and in a second position, a second supply inlet configured to be connected to said second source of pneumatic pressure agent, a first service brake outlet in fluidic communication with said second supply inlet and configured to be connected to said service brake pressure chamber, and a blocked first parking brake outlet configured to be connected to said parking brake pressure chamber and to block the passage of air; whereas said slide of said second distributor has, in a first position, a second service brake outlet configured to be connected to said service brake pressure chamber, a first exhaust outlet in fluidic communication with said second service brake outlet and opening to the atmosphere, and a blocked second parking brake outlet configured to be connected to said parking brake pressure chamber and to block the passage of air; and in a second position, a second parking brake outlet configured to be connected to said parking brake pressure chamber, a second exhaust outlet in fluidic communication with said second parking brake outlet and opening to the atmosphere, and a blocked second service brake outlet configured to be connected to said service brake pressure chamber and to block the passage of air;

said system comprises a diverting valve provided with a first aperture configured to be connected to said first source of pneumatic pressure agent, a second aperture configured to be connected, in said first position of said slides, to both the blocked first service brake outlet and to the second service brake outlet, and in said second position of said slides, to both the first service brake outlet and to the blocked second service brake outlet, and a third aperture configured to be connected to said service brake pressure chamber; said diverting valve comprising a movable valve member configured to have a first position in which said first aperture is in fluidic communication with said third aperture and a second position in which said second aperture is in fluidic communication with said third aperture; and/or said braking piston is disposed in said body and has two sides, respectively a first side configured to act on said braking linkage and a second side which is an opposite side to said first side and which is turned towards said service brake pressure chamber, as well as a piston rod connected to said second side of said braking piston and disposed in said service brake pressure chamber; said parking brake is disposed in said body, said blocking device is formed by a blocking finger and said actuating device is formed by a holding piston which is movable relative to said body and which with said body delimits a parking brake pressure chamber, as well as a spring member disposed in said body and configured to act on said holding piston; said holding piston being configured to hold said blocking finger in its first position when said parking brake pressure chamber is supplied and under pressure, in which first position said blocking finger is away from said piston rod; and said spring member being configured to hold said blocking finger in its second position when said parking brake pressure chamber has been vented, in which second position said blocking finger immobilizes said piston rod.

According to a second aspect, the invention also relates to a method of braking a rail vehicle, comprising a rail vehicle braking system as described above, comprising:

the step of supplying the parking brake pressure chamber of said system with a second source of pneumatic pressure agent to move the actuating device of said system in order for it to act on the blocking device of said system until the latter leaves free the braking piston of said system, the parking brake of said system then being in resting configuration;

the step of supplying the service brake pressure chamber of said system with a first source of pneumatic pressure agent so as to put said braking piston in service braking position;

the step of actuating the venting of the parking brake pressure chamber to move said blocking device until the latter comes to immobilize said braking piston in its service braking position, said parking brake then being in working configuration;

the step of supplying said service brake pressure chamber with said second source of pneumatic pressure agent so as to apply an additional force on the braking linkage of said system via said braking piston; and;

the step of actuating the venting of said service brake pressure chamber.

The method according to the invention is particularly simple and convenient to implement.

According to preferred, simple and economical features of the method according to the invention, said step of actuating the venting of said parking brake pressure chamber is triggered further to detecting a predetermined pressure threshold and/or said step of actuating the venting of said service brake pressure chamber is carried out by allowing said service brake pressure chamber to leak.

BRIEF DESCRIPTION OF THE DRAWING FIGURES

The disclosure of the invention will now be continued with the description of embodiments, given below by way of illustrative and non-limiting examples, with reference to the accompanying drawings, in which.

Figure 1:
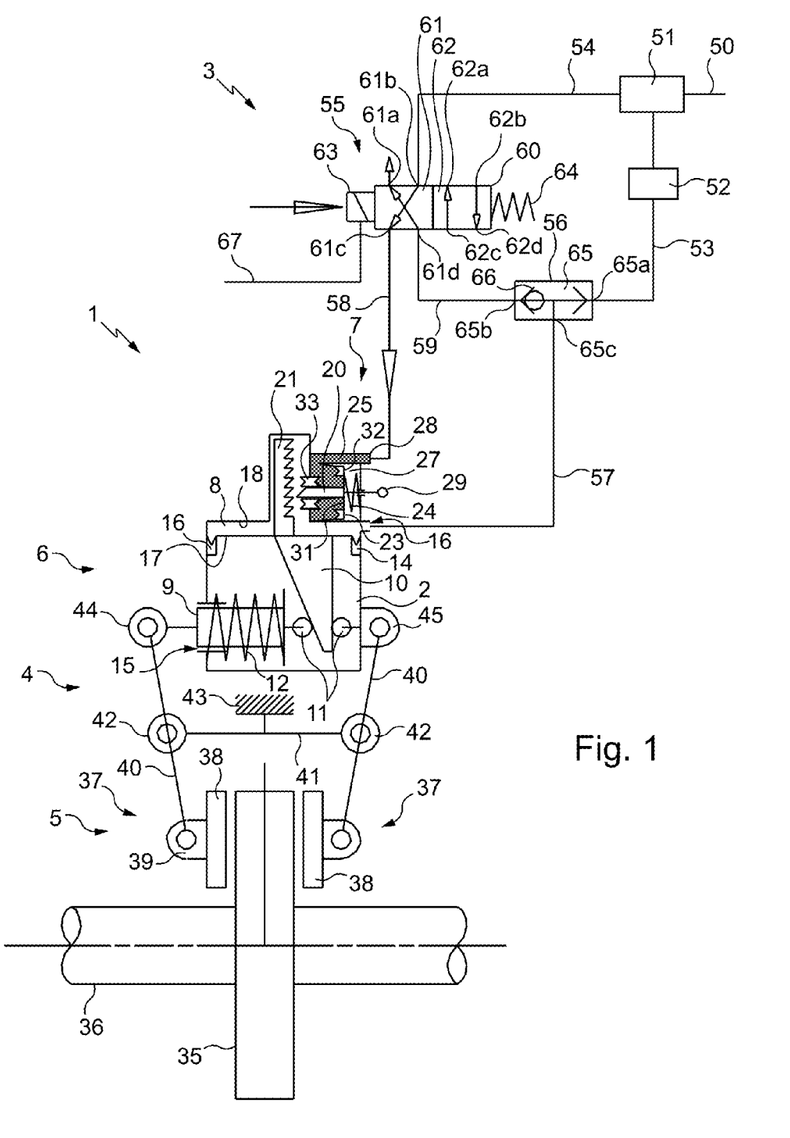
FIGS. 1 to 5 diagrammatically illustrate the operation of a rail vehicle braking system in accordance with the invention, which system is provided with a pneumatic distributor and is connected to different sources of pneumatic pressure agent of the vehicle, that system being respectively in different configurations.

FIG. 1 diagrammatically represents a rail vehicle braking system 1 of a rail vehicle with a brake having linings or blocks.

DETAILED DESCRIPTION OF THE INVENTION

The rail vehicle braking system 1 comprises a body 2 here forming both a service brake cylinder 6 and a parking brake cylinder 7, a conveyance network of pneumatic pipes 3 which is connected to the body 2, a braking linkage 4 mechanically linked to the body 2 as well as a brake 5 with linings on which the braking linkage 4 is configured to act.

The body 2 here has the form of a generally closed envelope.

The service brake 6 comprises a service brake piston 8 movable relative to the body 2 in a first axial direction, and a thrust rod 9 also movable relative to the body 2 in a second axial direction perpendicular to the first axial direction.

Together with the body 2 the braking piston 8 delimits a service brake pressure chamber 13.

The braking piston 8 has two sides respectively a first side 17 configured to act on the braking linkage 4 via the thrust rod 9 and a second side 18 which is an opposite side to the first side 17 and which is turned towards the service brake pressure chamber 13.

The service brake 6 further comprises a notched rod 21 fastened to the second side 18 of the braking piston 8. This notched rod 21 extends longitudinally in the first axial direction.

The braking piston 8 is configured to move in the body 2 while maintaining the service brake pressure chamber 13 relatively fluid-tight thanks to a membrane 14 disposed between that braking piston 8 and inside edges of the body 2.

The service brake 6 further comprises a wedge part 10 fastened to the first side 17 of the braking piston 8.

This wedge part 10 has a triangular section and is configured to cooperate with a set of rolling bearing stops 11, of which one of the rolling bearing stops is linked to the body 2 while the other of the rolling bearing stops is linked to the thrust rod 9.

This thrust rod 9 is provided with a wear adjuster configured to compensate for the wear of the linings of the brake 5 in order to avoid reduction of the braking force by excessive play (further to wear of the linings).

The service brake 6 further comprises a spring 12 here disposed around the thrust rod 9, between the rolling bearing stop which is linked to the latter and the inside edge of the body 2. This spring 12 is configured to return the stop which is linked to the thrust rod 9 against the wedge part 10.

The service brake 6 further comprises a first aperture 15 formed in the body 2 and configured to enable the movement of the thrust rod 9 through that first aperture 15.

The service brake 6 further comprises a second aperture 16 formed in the body 2 and opening into the service brake pressure chamber 13.

This service brake pressure chamber 13 is connected by service brake pipe 57 connected at the location of that second aperture 16 to a source of fluid under pressure for example such as a pneumatic line.

The body 2 comprises a cavity 27 situated against the service brake pressure chamber 13 and in which is disposed the parking brake 7.

The parking brake 7 comprises a blocking device here formed by a blocking finger 20 movable relative to the body 2 and extending in the second axial direction.

The parking brake 7 further comprises a holding piston 23 movable relative to the body 2 and with the latter delimiting a parking brake pressure chamber 25.

This holding piston 23 has two sides, respectively a first side 31 on which is attached the blocking finger 20 and a second side 32 which is an opposite side to the first side 31 and which is turned towards the parking brake pressure chamber 25.

The parking brake 7 further comprises a spring member 24 disposed between the body 2 and the second side 32 of the holding piston 23. This spring member 24 is configured to act on that holding piston 23 and therefore on the blocking finger 20.

It should be noted that the holding piston 23 and the spring member 24 form a movable actuating device of the parking brake 7.

The holding piston 23 is configured to move in the body 2 while maintaining the parking brake pressure chamber 25 relatively fluid-tight thanks to a membrane (not shown) disposed between that holding piston 23 and the inside edges of the body 2.

The parking brake 7 comprises a third aperture (not shown) formed in the body 2 and opening both into the parking brake pressure chamber 25 and into the service brake pressure chamber 13, which third aperture is configured to enable the movement of the blocking finger 20 through that third aperture.

It should be noted that the relative sealing between the parking brake pressure chamber 25 and the service brake pressure chamber 13 is ensured by the presence of a seal 33 disposed at the interface between that third aperture and the blocking finger 20.

The parking brake 7 further comprises a fourth aperture 28 formed in the body 2 and opening into the parking brake pressure chamber 25.

It will furthermore be noted that this parking brake pressure chamber 25 is connected by a parking brake pipe 58 that is connected at the location of that fourth aperture 28 to the source of fluid under pressure, for example such as a pneumatic line.

The parking brake 7 further comprises an unlocking part 29 attached to the second side 32 of the holding piston 23 and opening outside the body 2 through a fifth aperture (not shown) formed in that body 2 and opening into the cavity 27; such that this unlocking part 29 is accessible to be manipulated from outside the body 2.

The service brake 6 is disposed in the body 2 and is configured to act on the brake 5 via the braking linkage 4.

This brake 5 comprises a brake disk 35 (here viewed from above) mounted for example on a rail vehicle axle 36, or directly on the wheel to brake.

This brake 5 further comprises two shoes 37 each provided with a lining 38 configured to be applied in contact with the disk 35 to reduce its rotational speed and therefore that of the wheel to brake, as well as a fastening eye 39 provided at the remote opposite location to the surface of the lining 38 that is configured to be applied to the disk brake 35.

The braking linkage 4 comprises two deformable levers 40 each provided with an upper arm and a lower arm which are attached to each other.

Each arm of the levers 40 is jointed to a central connector 41 via two pivots 42.

The lower arm of each deformable lever 40 is linked to one of the shoes 37 via its fastening eye 39.

The upper arm of each deformable lever 40 is linked to a respective joint 44, 45.

The braking linkage 4 receives the body 2 between the upper arms of the deformable levers 40, at the location of the joints 45 and 46.

The body 2 is rotatably mounted on the joint 44 which is attached to an end of the thrust rod 9 whereas it has a fixed mounting to the joint 45, which is directly attached to that body 2.

The braking linkage 4 also comprises a fastening lug 43 attached to the central connector 41 for the mounting of that braking linkage 4 on the rail vehicle; in order for the brake shoes 37 to be situated on respective opposite sides of the brake disk 35 (or of the rail vehicle wheel).

It should be noted that the coming towards each other of the joints 44 and 45 enables the shoes 37 to move apart from each other and that conversely, the separation of those joints 44 and 45 enables the shoes 37 to be to clamped onto the brake disk 35 (or onto the rail vehicle wheel).

The conveyance network of pneumatic pipes 3 here comprises a main pneumatic line formed by a main pipe 50 which is configured for conveyance along the rail vehicle.

This network 3 further comprises an auxiliary reservoir 51 connected to the main pipe 50.

It is to be noted that such an auxiliary reservoir 51 is generally present on each bogie of the rail vehicle.

The main pipe 50 is configured to transport a fluid under a predetermined first pressure, for example substantially equal to 5.5 bar. The auxiliary reservoir 51 thus comprises a fluid at such a predetermined first pressure.

The network 3 comprises, at the outlet of the auxiliary reservoir 51 (the main pipe 50 being connected to the inlet of that auxiliary reservoir 51), two distinct pneumatic lines also called first source of pneumatic pressure agent and second source of pneumatic pressure agent, each being configured to supply the service brake 6 and/or the parking brake 7.

The first source of pneumatic pressure agent is formed by a pressure regulator 52 (here a pressure reducing valve) disposed at the outlet of the auxiliary reservoir 51 and configured to limit the pressure of the fluid passing in that first source of pneumatic pressure agent to a second determined pressure, for example substantially equal to approximately 3.8 bars.

This first source of pneumatic pressure agent further comprises a brake main pipe 53 connected to the pressure limiter 52 and configured to transport the fluid under the second predetermined pressure, as well as the service brake pipe 57 mentioned earlier, which is connected to the second aperture 16 of the service brake 6 to supply the service brake pressure chamber 13.

The network 3 further comprises a diverting valve 56 interconnected between the brake main pipe 53 and the service brake pipe 57.

The second source of pneumatic pressure agent is formed by a brake secondary pipe 54 connected directly to the outlet of the auxiliary reservoir 51, and by a parking brake pipe 58 connected to the fourth aperture 28 of the parking brake 7 which opens into the parking brake pressure chamber 25 to pneumatically supply the latter.

This second source of pneumatic pressure agent also comprises an intermediate pipe 59 as well as the service brake pipe 57, the diverting valve 56 being interconnected between that intermediate pipe 59 and that service brake pipe 57.

The network 3 also comprises a monostable distributor 55 here with four apertures and two positions which is interposed between the brake secondary pipe 54, the parking brake pipe 58 and the intermediate pipe 59, with each of its pipes 54, 58 and 59 being connected to that distributor 55.

This distributor 55 comprises a movable slide 60 and an actuator 63 which is configured to move that slide 60.

That actuator 63 is configured to receive a control signal 67, for example pneumatic.

That distributor 55 also comprises a return spring 64 configured to move the slide 60 from a first position to a second position.

Figures 2, 3:
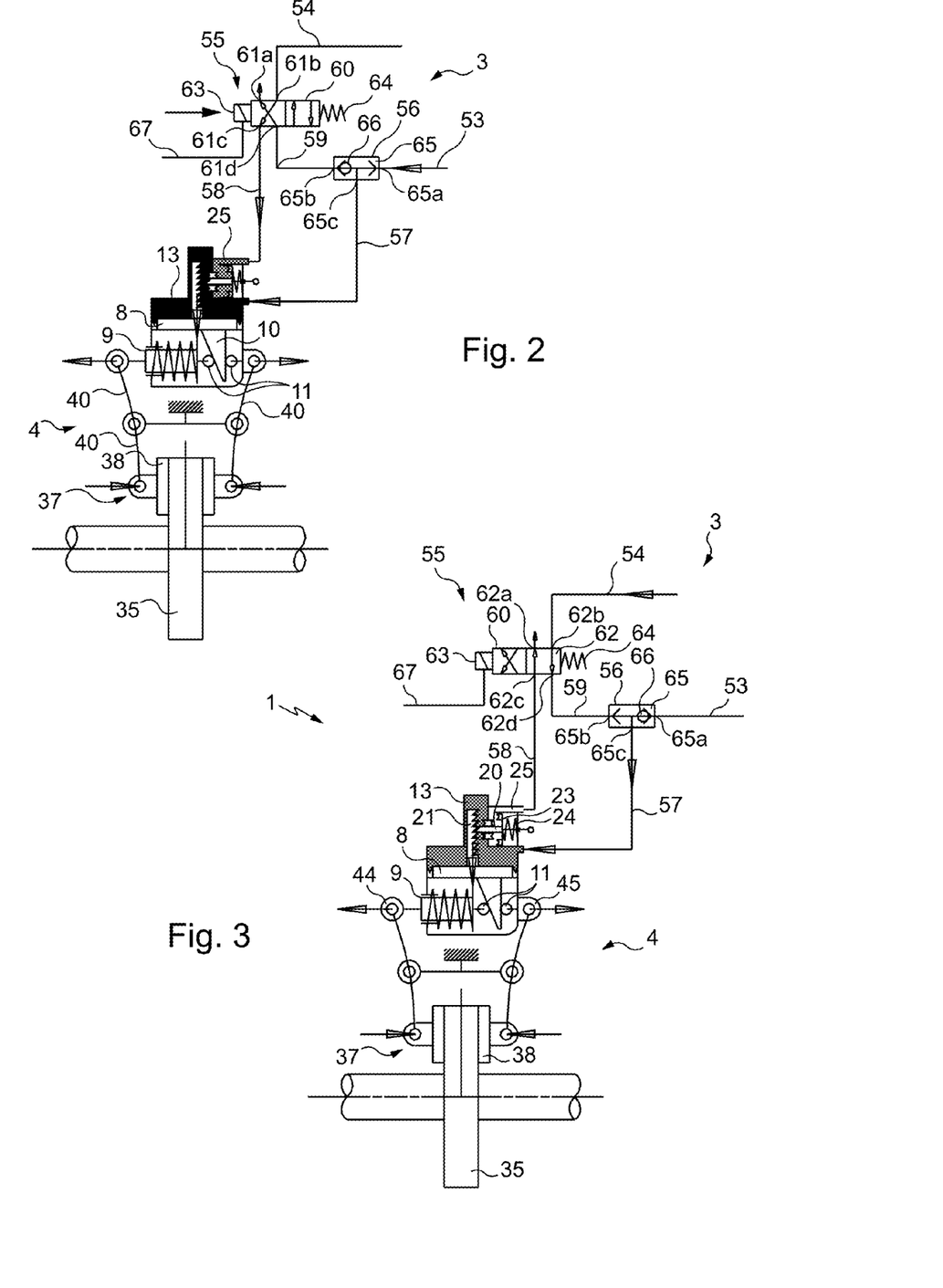

It should be noted that in FIGS. 1 and 2, the distributor 55 is represented in its first position, which first position is not its position by default.

Figure 4:
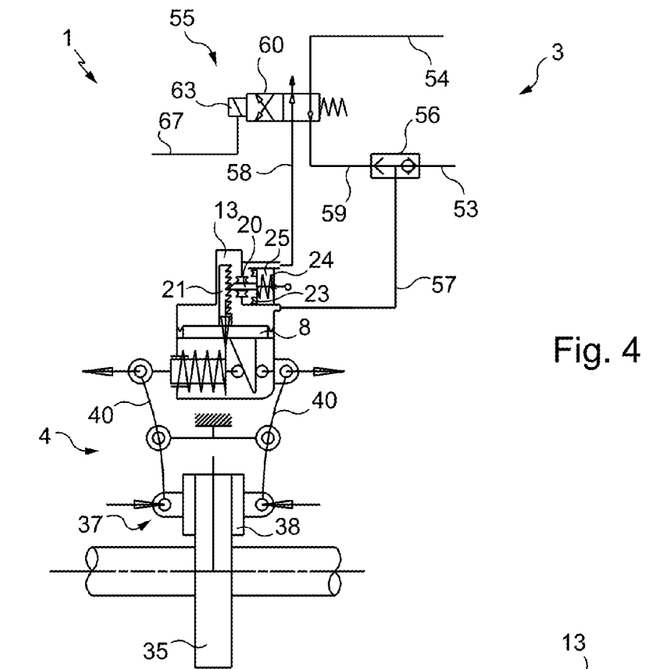

In other words, the actuator 63 of the distributor 55 is configured to receive a pneumatic signal that is not null or which is at least sufficient to move the slide 60 between its second position (position by default also called "normally closed" position illustrated in FIGS. 3 and 4) and its first position (illustrated in FIGS. 1 and 2).

It should be noted that the slide 60 comprises a first chamber 61 provided with four inlets/outlets 61a-d and with a second chamber 62 also provided with four inlets/outlets 62a-d.

In each of the first and second positions of the slide 60, the brake secondary pipe 54, the parking brake pipe 58 as well as the intermediate pipe 59 are each linked to one of the four inlets/outlets 61a-d and 62a-d.

As regards the valve 56, it comprises a chamber 65, a first aperture 65a to which is connected the brake main pipe 53, a second aperture 65b to which is connected the intermediate pipe 59 as well as a third aperture 65c to which is connected the service brake pipe 57.

Each of these first, second and third apertures 65a-c opens into the chamber 65 of the valve 56.

The valve 56 further comprises a valve member 66 movable in the chamber 65 and configured to place in fluidic communication either the first and third apertures 65a and 65c, or the second and third apertures 65b and 65c.

The operation of the rail vehicle braking system 1 will now be described with reference to FIGS. 1 to 5, which diagrammatically illustrate different configurations of the system 1.

In FIG. 1, the rail vehicle braking system 1 is in a resetting configuration.

In this resetting configuration, the service brake pressure chamber 13 is not supplied (it has been vented) such that the braking piston 8 is in a resting position, in which it does not apply any braking force on the thrust rod 9.

Therefore, the joints 44 and 45 of the braking linkage 4 are away from each other which allows the shoes 37 to be kept away from the brake disk 35.

As regards the parking brake pressure chamber 25, it is supplied by the parking brake pipe 58, which pipe is connected via the distributor 55 to the brake secondary pipe 54, itself being directly connected to the auxiliary reservoir 51.

The parking brake pressure chamber 25 is thus under pressure such that the holding piston 23 is in a first position in which the spring member 24 is compressed and the blocking finger 20 is in a first position away from the notched rod 21 of the service brake 6.

In this resetting configuration of the system 1, the parking brake 7 is in a reset configuration whereas the service brake 6 is in a resting configuration.

Furthermore, the slide 60 of the distributor 55 is in its first position which indicates that the actuator 63 has received a control signal 67 (that is not null) and thus the slide 60 has been moved from its second position (position by default) to its first position against the return spring 64, which is compressed.

In this first position of the slide 60, the first chamber 61 has a first supply inlet 61b connected to the auxiliary reservoir 51 via the brake secondary pipe 54, a first parking brake outlet 61c in fluidic communication with the first supply inlet 61b and connected to the parking brake pressure chamber 25 via the parking brake pipe 58.

Furthermore, the first chamber 61 has a first service brake outlet 61d connected to the second aperture 65b of the diverting valve 56 and a first exhaust outlet 61a in fluidic communication with the first service brake outlet 61d and opening to the atmosphere.

None of the inlets or outlets of the second chamber 62 of the drawer 60 is connected.

It should be noted that the parking brake 7 is dimensioned and configured such that the pressure for resetting the parking brake 7 is relatively low, for example of the order of 2 bar to 6 bars.

In FIG. 2, the rail vehicle braking system 1 is represented in a configuration for application of the service brake 6.

In this configuration for application of the service brake 6, the service brake pressure chamber 13 is supplied by the service brake pipe 57 and by the brake main pipe 53, through the diverting valve 56.

The service brake pressure chamber 13 is thus under pressure and the braking piston 8 has been moved in the first axial direction from its first position to a second position in which the wedge piece 10 has moved apart the set of rolling bearing stops 11, thereby moving the thrust rod 9 and the joint 44.

Therefore, the joints 44 and 45 move away from each other and give rise to the coming towards each other of the shoes 37 and thus the application of the linings 38 against the brake disk 35.

It should be noted that in the configuration for application of the service brake 6 of the system 1, the levers 40 are deformed (elastically).

It will also be noted that in this configuration illustrated in FIG. 2, the parking brake pressure chamber 25 is still under pressure as mentioned with reference to with reference to FIG. 1.

In this configuration of application of the service brake 6 of the system 1, the parking brake 7 is still in its reset configuration whereas the service brake 6 is in a working configuration.

The position of the slide 60 of the distributors 55 is thus similar to that illustrated in FIG. 1.

The difference lies in the fact that the brake main pipe 53 is under pressure, that the fluid passes therein between the chamber 65 of the diverting valve 56 by the first aperture 65a, obliging the movable valve member 66 to come to substantially obturate the second aperture 65b, and thereby to permit the fluidic communication between the first aperture 65a and the third aperture 65c to supply the service brake pipe 57 and therefore the service brake pressure chamber 13.

It should be noted that the movable valve member 66 prevents the fluidic communication between the second aperture 65b and the third aperture 65c It will also be noted that in the configuration illustrated in FIG. 2, the first predetermined pressure of the fluid injected into the service brake pressure chamber 13 moves the braking piston 8 by a predetermined travel in order to act on the braking linkage 4 with a first predetermined load and therefore apply a first predetermined force on the brake disk 35.

In FIG. 3, the rail vehicle braking system 2 is represented in a locking configuration in which the braking piston 8 of the service brake 6 is immobilized in its second position illustrated in FIG. 2.

It should be noted that the braking linkage 4 is here in the same position as that illustrated in FIG. 2.

As regards the service brake pressure chamber 13 this is still under pressure whereas the parking brake pressure chamber 25 has been vented.

The venting of the parking brake pressure chamber 25 frees the spring member 24, which moves the holding piston 23 from its first position towards a second position referred to as stable position and thus moves the blocking finger 20 from its first position to a second position in which it comes to immobilize the notched rod 21 by meshing of the distal end of that blocking finger 20 with the notches formed on the notched rod 21.

To perform the venting of the parking brake pressure chamber 25, the actuator 63 of the distributor 55 has received a different control signal 67, here null for example, such that the slide 60 has passed from its first position to its second position under the action of the return spring 64.

In this second position of the slide 60, the second chamber 62 of that slide 60 has a second parking brake outlet 62c connected to the parking brake pressure chamber 25 via the parking brake pipe 58 and a second exhaust outlet 62a in fluidic communication with the second parking brake outlet 62c and opening to the atmosphere.

In that same FIG. 3, the rail vehicle braking system 2 is also illustrated in a so-called oversupply configuration of the service brake 6.

As a matter of fact, the second chamber 62 of the slide 60 has a second supply inlet 62b connected to the brake secondary pipe 54, itself connected directly to the auxiliary reservoir 51, and a second service brake outlet 62d in fluidic communication with the second supply inlet 62b and connected to the intermediate pipe 59.

The fluid under the second predetermined pressure conveyed by the secondary 54 and intermediate 59 brake pipes enters the chamber 65 of the diverting valve 56 by the second aperture 65b and makes the valve member 66 move so as to come to substantially obturate the first aperture 65a of that valve 56 and thus place in fluidic communication the second aperture 65b and the third aperture 65c of that diverting valve 56.

Therefore, the fluid under the second predetermined pressure, which is greater than the first predetermined pressure, is conveyed by the service brake pipe 57 into the service brake pressure chamber 13, thereby enabling the latter to be oversupplied.

The supply of that service brake pressure chamber 13 by the fluid under the predetermined second pressure makes it possible to move the braking piston 8 to further open the set of rolling bearing stops 11 and thus move further apart the joints 44 and 45 of the braking linkage 4.

This moving apart which represents a second predetermined load greater than the first predetermined load applied by the braking piston 8 generates a second predetermined force greater than the first predetermined force on the brake disk 35 via the shoes 37.

It should be noted that the notched rod 21 and the blocking finger 20 are configured to enable such a movement of the braking piston 8 while the blocking finger 20 immobilizes that notched rod 21.

For example, the notched rod 21 has a predetermined teeth formation and the distal end of the blocking finger 20 also has a predetermined teeth formation complementary to the predetermined teeth formation of the notched rod 21.

It should be noted that the blocking finger 20 enables the movement of the notched rod 21 only in the direction of movement of the braking piston 8 to clamp the brake disk 35 still further and again immobilize the notched rod 21 as soon as the latter has been stopped, in the third position of the braking piston 8.

In these locking and oversupply configurations of the service brake 6, the parking brake 7 and the service brake 6 are each in a working configuration.

In FIG. 4, the rail vehicle braking system 2 is represented in a configuration for venting the service brake 6.

The venting of the service brake pressure chamber 13 is carried out through the leakages in the network 3. In other words, neither the service pressure chamber 13, nor the service brake pipe 57, nor the intermediate pipe 59, nor the brake secondary pipe 54 nor the brake main pipe 53 are directly connected to the atmosphere.

It should be noted that the fluid under pressure present in the service brake pressure chamber 13 exhausts from the latter in particular from the brake main pipe 53.

It should be noted that in this venting of the service brake 7 of the system 1, the distributor 55 has its slide 60 in its second position.

It will also be noted that, thanks to the parking brake 6 and in particular the blocking finger 20—holding piston 23—spring member 24 group, in combination with the notched rod 21 which is fastened to the braking piston 8 of the service brake 6, that braking piston 8 remains in its third position in which it acts on the braking linkage 4 to apply the predetermined second force on the brake disk 35 via the shoes 37, despite the venting of the service brake pressure chamber 13.

In this venting configuration of the service brake 6, the parking brake 7 is in a working configuration whereas the service brake 6 is blocked in its working configuration, despite the venting of the service brake pressure chamber 13.

Figure 5:
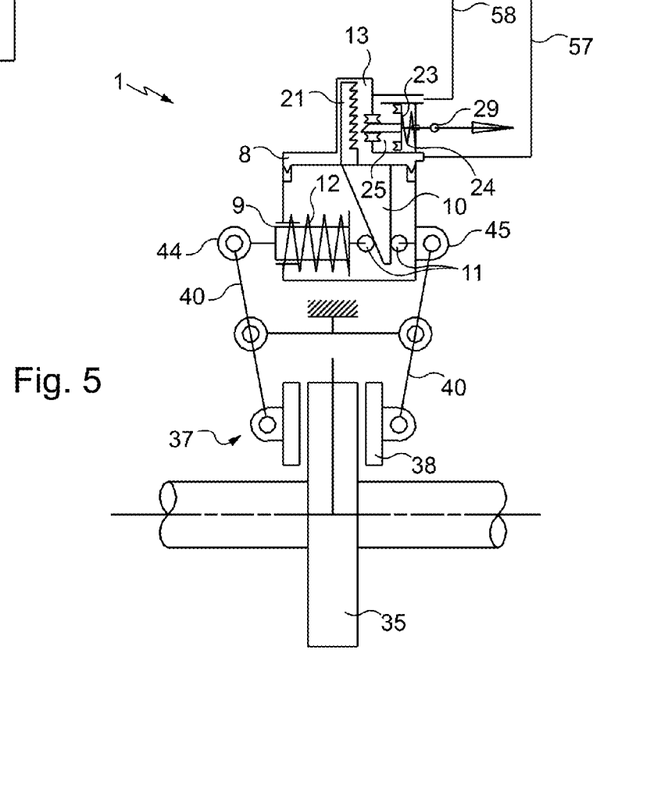

In FIG. 5, the rail vehicle braking system 1 is represented in an unlocking configuration.

In this unlocking configuration, a force has been applied to the unlocking part 29 of the parking brake 6 so as to pull that unlocking part 29 towards the outside of the body 2.

The movement of that unlocking part 29 drives the holding piston 23 and therefore the blocking finger 20 against the spring member 24 which is thereby compressed.

Due to the blocking finger 20 reaching its second position, the latter no longer cooperates with the notched rod 21, which is thus free.

Therefore, the spring 12 disposed around the thrust rod 9 and between the inside edge of the body 2 and the rolling bearing stop fastened to the thrust rod 9 resumes its initial position.

This spring 12 thus drives the rolling bearing stop 11 disposed between the thrust rod 9 and the wedge part 10 in the second axial direction, thereby driving the return of the braking piston 8 in the first axial direction, to reach its resting position.

The joints 44 and 45 of the braking linkage are brought towards each other such that the deformable levers 40 resume their initial positions illustrated in FIG. 1 and the shoes 37 are again situated away from the brake disk 35, which is thus free to rotate (the brake disk 35 is not braked).

In this unlocking configuration, the parking brake 7 is in an unlocking configuration whereas the service brake 6 is in a resting configuration.

In the unlocking configuration of the system 1, it should be noted that the distributor 55 is for example in the same configuration as that illustrated in FIG. 4, with the service brake chamber 13 and parking chamber 25 vented.

It should be noted that the parking brake 6 is configured such that the force to apply for the unlocking, via the unlocking part 29, is relatively low in order to be provided manually by a user such as the driver of the rail vehicle. For example this force is of the order of approximately 10 to 50 daN.

In a variant not illustrated, the oversupply of the service brake pressure chamber 13 (illustrated in FIG. 3) cannot be carried out before the application of the parking brake 7 and therefore before the immobilization of the braking piston 8 of the service brake 6. In this case, the notched rod 21 as well as the blocking finger 20 have no need to be configured to enable a unidirectional movement of the notched rod 21 despite the immobilization of the latter by the blocking finger 20.

More generally, the operations of locking by the application of the parking brake 7 and of oversupplying of the service brake 6 can be carried out in any order; and these operations may also be carried out at the same time.

Figure 6:
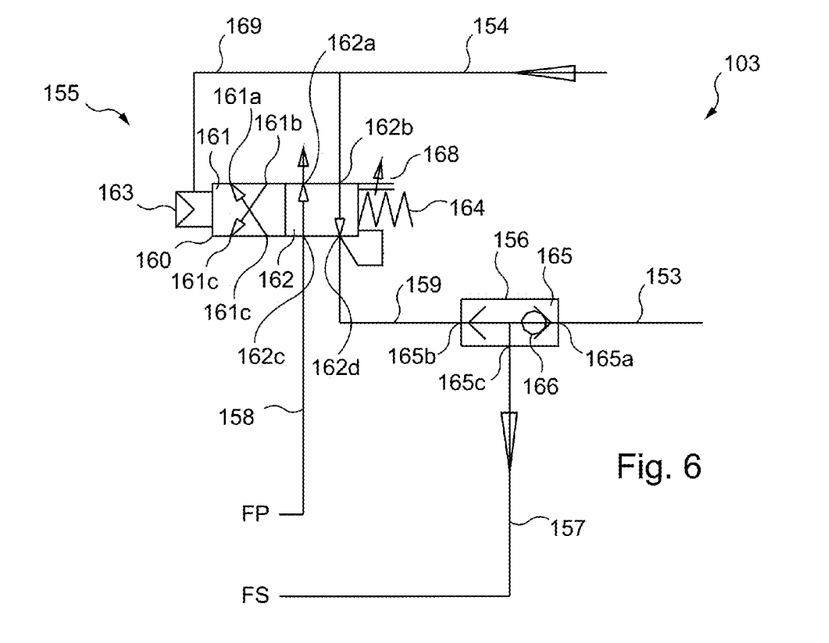
FIGS. 6 and 7 diagrammatically represent two variant embodiments of the distributor which can be seen in FIGS. 1 to 4.

FIG. 6 illustrates a variant embodiment of the conveyance network of pneumatic pipes illustrated in FIGS. 1 to 4.

Generally, for similar parts the same references have been used, but to which the number 100 has been added.

The conveyance network of pneumatic pipes 103 here comprises a distributor 155 and a diverting valve 156.

The distributor 155 comprises a slide 160 provided with a first chamber 161 and with a second chamber 162, with an actuator 163 and with a return spring 164.

The first and second chambers 161 and 162 each have four apertures respectively referenced 161a, 161b, 161c and 161d and 162a, 162b, 162c and 162d; and the distributor 155 is configured for the slide 160 to have two positions.

The distributor 155 further comprises a threshold valve 168 configured to control and actuate the passage of the slide 160 of the distributor 155 from a first state of the latter to a second state.

Here, the first state correspond to the first position of the slide 160 (not illustrated) and the second state corresponds to the second position of the slide 160, illustrated in FIG. 6.

The threshold valve 168 is thus configured to make the slide 160 pass from its first position to its second position when the pressure value of the fluid under pressure in the pressure chamber of the parking brake is less than a predetermined threshold value.

The triggering of the threshold valve 168 enables the venting of the pressure chamber of the parking brake and thus the passage of the latter into working configuration to block the braking piston of the service brake.

It should be noted that a pressure drop is detected here in the pressure chamber of the parking brake since it is considered that such a pressure drop signifies a pressure drop in the pressure chamber of the service brake. To be precise, if there are leakages at the pressure chamber of the parking brake, there are also leakages from the pressure chamber of the service brake.

The use of such a threshold valve 168 is particularly advantageous since, after the application of the service brake (as described with reference to FIG. 2) leakages could slowly vent the service brake pressure chamber and the pressure chamber of the parking brake, without the parking brake being applied.

Thus, the threshold valve 168 makes it possible to avoid this situation since the switching of the slide 160 enables the application of the parking brake as soon as the pressure of the fluid in the parking brake pressure chamber is less than the predetermined threshold value of pressure (and thus as soon as the pressure of the fluid in the service brake pressure chamber has dropped significantly).

The slide 160 with two positions has, in its first position not illustrated, a first supply inlet 161b configured to be connected to the brake secondary pipe 154, itself linked to the auxiliary reservoir, a first parking brake outlet 161c in fluidic communication with the first supply inlet 161b and configured to be connected to the pressure chamber of the parking brake denoted FP in the drawing, a first service brake outlet 161d configured to be connected to the pressure chamber of the service brake denoted FS in the drawing and a first exhaust outlet 161a in fluidic communication with the first service brake outlet 161d and opening to the atmosphere;

The slide 160 with two positions has, in its illustrated second position, a second supply inlet 162b connected to the brake secondary pipe 154, itself linked to the auxiliary reservoir, a second service brake outlet 162d in fluidic communication with the second supply inlet 162b and connected to the pressure chamber of the service brake FS, a second parking brake outlet 162c connected to the pressure chamber of the parking brake FP and a second exhaust outlet 162a in fluidic communication with the second parking brake outlet 162c and opening to the atmosphere.

Furthermore, the diverting valve 156 is provided with a first aperture 165a connected to the brake main pipe 153, a second aperture 165b configured to be connected, in the first position of the slide 160, to the first service brake outlet 161d, and in the second position of the slide 160, to the second service brake outlet 162d, and a third aperture 165c connected to the pressure chamber of the service brake FS; the diverting valve 156 comprising a movable valve member 166 configured to have a first position in which the first aperture 165a is in fluidic communication with the third aperture 165c and a second position in which the second aperture 165b is in fluidic communication with the third aperture 165c.

It will be noted that the actuator 163 is connected to the brake secondary pipe 154 via an actuating pipe 169, for the movement of the slide 160 on triggering of the threshold valve 168.

Figure 7:
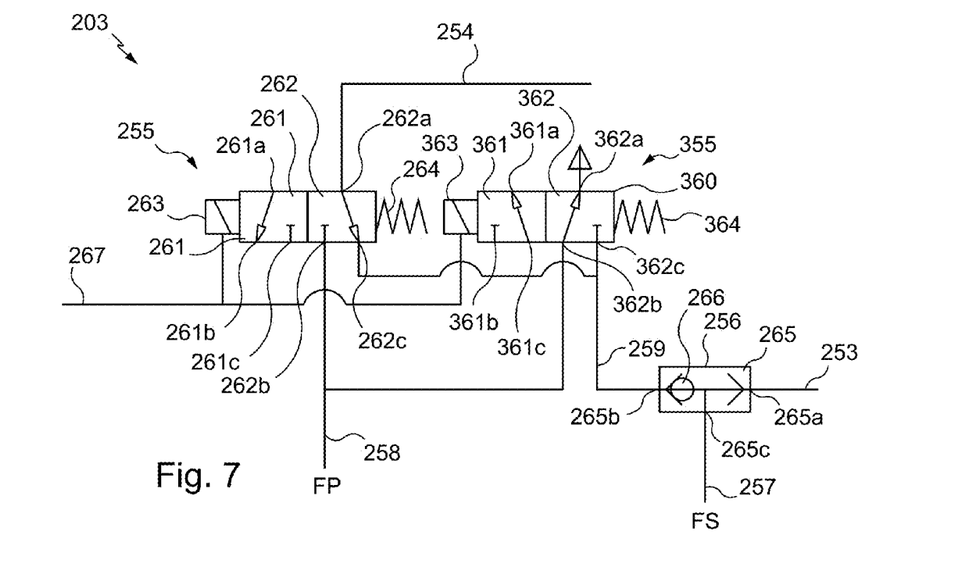

FIG. 7 illustrates another variant embodiment of the conveyance network of pneumatic pipes illustrated in FIGS. 1 to 4.

Generally, for similar parts the same references have been used, to which the numbers 200 and 300 have been added.

The conveyance network of pneumatic pipes 203 comprises a diverting valve 256 and two distributors 255 and 355 of the type having three apertures and two positions and which are similar.

These two distributors 255 and 355 are configured to be actuated simultaneously by an actuating signal 267 which is respectively connected to the actuators 263 and 363, to make them pass from their second position illustrated in FIG. 7 to their position first (not illustrated).

These two distributors 255 and 355 further comprise a spring 264, 364 to return the slides 260, 360 to their second position (initial position referred to as "normally closed").

The slides 260 and 360 are each provided with a first chamber 261, 361 and with a second chamber 262, 362.

Each of these chambers is provided with three apertures 261a, 261b and 261c, 262a, 262b and 262c, 361a, 361b and 361c, 362a, 362b and 362c.

It should be noted that the slide 260 of the first distributor 255 has, in its first position not illustrated, a first supply inlet 261a configured to be connected to the brake secondary pipe 254, a first parking brake outlet 261b in fluidic communication with the first supply inlet 261a and configured to be connected to the pressure chamber of the parking brake denoted FP in the drawing, and a blocked first service brake outlet 261c configured to be connected to the pressure chamber of the service brake denoted FS in the drawing and to block the passage of air; whereas the slide 360 of the second distributor 355 has, in its first position which is not illustrated, a second service brake outlet 361c configured to be connected to the pressure chamber of the service brake FS, a first exhaust outlet 361a in fluidic communication with the second service brake outlet 361a and opening to the atmosphere, and a blocked second parking brake outlet 361b configured to be connected to the pressure chamber of the parking brake FP to block the passage of air.

The slide 260 furthermore has, in its second illustrated position, a second supply inlet 262a connected to the brake secondary pipe 254, a first service brake outlet 262c in fluidic communication with the second supply inlet 262a and connected to the pressure chamber of the service brake FS, and a blocked first parking brake outlet 262b connected to the pressure chamber of the parking brake FP to block the passage of the air; whereas the slide 360 of the second distributor 355 has, in its illustrated second position, a second parking brake outlet 362b connected to the pressure chamber of the parking brake FP, a second exhaust outlet 362a in fluidic communication with the second parking brake outlet 361b and opening to the atmosphere, and a blocked second service brake outlet 361c connected to the pressure chamber of the service brake FS to block the passage of the air.

Furthermore, the diverting valve 256 is provided with a first aperture 265a connected to the brake main pipe 253, with a second aperture 265b configured to be connected, in the first position of the slides 260 and 360, both to the blocked first service brake outlet 261c and to the second service brake outlet 361c, and in the second position of the slides 260 and 360, to both the first service brake outlet 262c and to the blocked second service brake outlet 362c, and with a third aperture 265c connected to the pressure chamber of the service brake FS; the diverting valve 256 comprising a movable valve member 266 configured to have a first position in which the first aperture 265a is in fluidic communication with the third aperture 265c and a second position in which the second aperture 265b is in fluidic communication with the third aperture 265c.

In variants that are not illustrated:
  distributors 55, 155, 255 and 355 are not pneumatically controlled but instead electrically or hydraulically;
  the distributors 255 and 355 are furthermore each provided with a threshold valve like that described with reference to FIG. 6;
  in the resetting configuration of the rail vehicle braking system, the operation of resetting is carried out electrically or mechanically or hydraulically rather than pneumatically;
  in the unlocking configuration of the rail vehicle braking system, the unlocking part is held in an unlocking position of the parking brake by a lock that is pneumatic, electric or mechanical;
  in the unlocking configuration of the rail vehicle braking system, the unlocking command is carried out manually through the use of at least one cable, or pneumatically, electrically or hydraulically;
  the unlocking configuration of the rail vehicle braking system is obtained by supplying the parking brake pressure chamber, as for the resetting configuration rather than by the actuation of an unlocking part;
  the service brake pressure chamber may be vented deliberately rather than by the leakages of the system;
  in the locking configuration, the actuation of the blocking device may be carried out by an electrical actuator rather than by the pressurization of a pressure chamber supplied by a distributor;
  the rail vehicle braking system lacks any regulator between the auxiliary reservoir and the service brake pressure chamber and/or lacks any auxiliary reservoir and/or the first and second sources of pneumatic pressure agent are totally separate rather than coming from the same main pipe;
  the rail vehicle braking system comprises a service brake lacking a wedge part attached to the braking piston, such that this piston acts directly on the thrust rod, which acts on the deformable levers; and in that case, the braking piston together with its notched rod and the thrust rod are movable in the second axial direction whereas the parking brake is configured such that the blocking finger and the holding piston are movable in the first axial direction;

the rail vehicle braking system has a braking linkage different from that illustrated in the Figures, in particular the braking linkage comprises a block configured to act directly on a wheel of the rail vehicle, that block being directly jointed by a pivot type joint fastened to the thrust rod, a rigid lever fastened to the body of the system as well as a deformable lever fastened both to the rigid lever and to the joint on the block; and/or the rail vehicle braking system comprises a braking linkage configured to act on a brake having blocks as described above and is provided with a service brake with or without a wedge part attached to the braking piston.

It should be noted more generally that the invention is not limited to the examples described and represented.

The invention claimed is:

1. A rail vehicle braking system with brakes that have at least one lining or at least one block (5), comprising:
a body (2);
a braking linkage (4) configured to act on at least one said brake that has at least one lining or at least one block (5);
a service brake (6) comprising a braking piston (8) which is movable relative to said body (2) to act on said braking linkage (4) and delimits with said body (2) a service brake pressure chamber (13) configured to be supplied by a first source of pneumatic pressure agent (50, 51, 53, 57 ; 153 ; 253) to put said braking piston (8) into a service braking position; and
a parking brake (7) configured to act on said braking piston (8) of said service brake (6) and having a working configuration and a resting configuration;
said rail vehicle braking system (1) being characterized in that said parking brake (7) comprises:
a blocking device (20) which is movable relative to said body (2) to act on said braking piston (8) and having a first position and a second position in which said blocking device (20) is configured to immobilize said braking piston (8) in service braking position, said parking brake (7) then being in working configuration;
an actuating device (23, 24) movable relative to said body (2), delimiting with said body (2) a parking brake pressure chamber (25) configured to be supplied by a second source of pneumatic pressure agent (50, 51, 54, 58 ; 154 ; 254), and having a stable position in which said actuating device (23, 24) is configured to hold said blocking device in its second position;
said rail vehicle braking system (1) being configured such that, when said actuating device (23, 24) is in its stable position, said service brake pressure chamber (13) is supplied by said second source of pneumatic pressure agent (50, 51, 54, 58 ; 154 ; 254), of which the pressure is greater than that of said first source of pneumatic pressure agent (50, 51, 53, 57 ; 153 ; 253), in order to apply, when said parking brake (7) is in working configuration, a greater braking force than the braking force applied when said braking piston (8) is in its service braking position and said parking brake (7) is in its resting configuration.

2. A system according to claim 1, further comprising at least one pneumatic distribution device (55 ; 155 ; 255, 355) configured to be supplied by said second source of pneumatic pressure agent (50, 51, 54, 58 ; 154 ; 254) and to be connected to said parking brake pressure chamber (25) in order to put said parking brake (7) respectively in its resting configuration when it is supplied by said second source of pneumatic pressure agent (50, 51, 54, 58 ; 154 ; 254) and in its working configuration when it is not supplied by said second source of pneumatic pressure agent (50, 51, 54, 58 ; 154 ; 254).

3. A system according to claim 2, wherein said at least one pneumatic distribution device (55 ;
155 ; 255, 355) is configured to be connected to said service brake pressure chamber (13) in order to supply said service brake (6) with said second source of pneumatic pressure agent (50, 51, 54, 58 ; 154 ; 254).

4. A system according to claim 2, further comprising a diverting valve (56 ; 156 ; 256) configured to be connected to said first source of pneumatic pressure agent (50, 51, 53, 57 ; 153 ; 253), to said second source of pneumatic pressure agent (50, 51, 54, 58 ; 154 ; 254) and to said service brake pressure chamber (13) for its supply.

5. A system according to claim 4, wherein said pneumatic distribution device (55 ; 155 ; 255, 355) is in fluidic communication with said diverting valve (56 ; 156 ; 256) for the supply of said service brake pressure chamber (13).

6. A system according to claim 2, wherein said pneumatic distribution device (155) is provided with a threshold valve (168) configured to control and actuate the passage from a first state of said pneumatic distribution device (155) to a second state of said pneumatic distribution device (155).

7. A system according to claim 2, wherein said pneumatic distribution device is formed by a distributor (55; 155) provided with four apertures and a slide (60; 160) with two positions.

8. A system according to claim 7, wherein said slide (60 ; 160) with two positions has, in a first position, a first supply inlet (61b; 161b) configured to be connected to said second source of pneumatic pressure agent (50, 51, 54, 58 ; 154), a first parking brake outlet (61c; 161c) in fluidic communication with said first supply inlet (61b; 161b) and configured to be connected to said parking brake pressure chamber (25), a first service brake outlet (61d; 161d) configured to be connected to said service brake pressure chamber (13) and a first exhaust outlet (61a; 161a) in fluidic communication with said first service brake outlet (61d; 161d) and opening to the atmosphere; and in a second position, a second supply inlet (62b; 162b) configured to be connected to said second source of pneumatic pressure agent (50, 51, 54, 58 ; 154), a second service brake outlet (62d ; 162d) in fluidic communication with said second supply inlet (62b; 162b) and configured to be connected to said service brake pressure chamber (13), a second parking brake outlet (62c; 162c) configured to be connected to said parking brake pressure chamber (25) and a second exhaust outlet (62a; 162a) in fluidic communication with said second parking brake outlet (62c; 162c) and opening to the atmosphere.

9. A system according to claim 8, further comprising a diverting valve (56 ; 156) provided with a first aperture (65a; 165a) configured to be connected to said first source of pneumatic pressure agent (50, 51, 53, 57 ; 153), a second aperture (65b; 165b) configured to be connected, in said first position of said slide (60 ; 160), to said first service brake outlet (61d; 161d), and in said second position of said slide (60 ; 160), to said second service brake outlet (62d; 162d), and a third aperture (65c; 165c) configured to be connected to said service brake pressure chamber (13); said diverting valve (56 ; 156) comprising a movable valve member (66 ; 166) configured to have a first position in which said first aperture (65a; 165a) is in in fluidic communication with said third aperture (65c; 165c) and a second position in which said second aperture (65b; 165b) is in fluidic communication with said third aperture (65c; 165c).

10. A system according to claim 2, wherein said pneumatic distribution device is formed by a first distributor (255) and by a second distributor (355) each provided with three apertures and with a slide (260, 360) having two positions.

11. A system according to claim 10, wherein said slide (260) of said first distributor (255) has, in a first position, a first supply inlet (261a) configured to be connected to said second source of pneumatic pressure agent (254), a first parking brake outlet (261b) in fluidic communication with said first supply inlet (261a) and configured to be connected to said parking brake pressure chamber, and a blocked first service brake outlet (261c) configured to be connected to said service brake pressure chamber and to block the passage of air; and in a second position, a second supply inlet (262a) configured to be connected to said second source of pneumatic pressure agent (254), a first service brake outlet (262c) in fluidic communication with said second supply inlet (262a) and configured to be connected to said service brake pressure chamber, and a blocked first parking brake outlet (262b) configured to be connected to said parking brake pressure chamber and to block the passage of air; whereas said slide (360) of said second distributor (355) has, in a first position, a second service brake outlet (361c) configured to be connected to said service brake pressure chamber, a first exhaust outlet (361a) in fluidic communication with said second service brake outlet (361a) and opening to the atmosphere, and a blocked second parking brake outlet (361b) configured to be connected to said parking brake pressure chamber and to block the passage of air;

and in a second position, a second parking brake outlet (362b) configured to be connected to said parking brake pressure chamber, a second exhaust outlet (362a) in fluidic communication with said second parking brake outlet (361b) and opening to the atmosphere, and a blocked second service brake outlet (361c) configured to be connected to said service brake pressure chamber and to block the passage of air.

12. A system according to claim 11, further comprising a diverting valve (256) provided with a first aperture (265a) configured to be connected to said first source of pneumatic pressure agent (253), a second aperture (265b) configured to be connected, in said first position of said slides (260, 360), to both the blocked first service brake outlet (261c) and to the second service brake outlet (361c), and in said second position of said slides (260, 360), to both the first service brake outlet (262c) and to the blocked second service brake outlet (362c), and a third aperture (265c) configured to be connected to said service brake pressure chamber; said diverting valve (256) comprising a movable valve member (266) configured to have a first position in which said first aperture (265a) is in fluidic communication with said third aperture (265c) and a second position in which said second aperture (265b) is in fluidic communication with said third aperture (265c).

13. A system according to claim 1, wherein said braking piston (8) is disposed in said body (2) and has two sides, respectively a first side (17) configured to act on said braking linkage (4) and a second side (18) which is an opposite side to said first side (17) and which is turned towards said service brake pressure chamber (13), as well as a piston rod (21) connected to said second side (18) of said braking piston (8) and disposed in said service brake pressure chamber (13); said parking brake (7) is disposed in said body (2), said blocking device is formed by a blocking finger (20) and said actuating device is formed by a holding piston (23) which is movable relative to said body (2) and which with said body (2) delimits a parking brake pressure chamber (25), as well as a spring member (24) disposed in said body (2) and configured to act on said holding piston (23); said holding piston (23) being configured to hold said blocking finger (20) in its first position when said parking brake pressure chamber (25) is supplied and under pressure, in which first position said blocking finger (20) is away from said piston rod (21); and said spring member (24) being configured to hold said blocking finger (21) in its second position when said parking brake pressure chamber (25) has been vented, in which second position said blocking finger (20) immobilizes said piston rod (21).

14. A method of braking a rail vehicle comprising a rail vehicle braking system (1) according to claim 1, comprising the steps of:
supplying the parking brake pressure chamber (25) of said system (1) with a second source of pneumatic pressure agent (50, 51, 54, 58 ; 154 ; 254) to move the actuating device (23, 24) of said system (1) in order for it to act on the blocking device (20) of said system (1) until the latter leaves free the braking piston (8) of said system (1), the parking brake (7) of said system (1) then being in resting configuration;
supplying the service brake pressure chamber (13) of said system (1) with a first source of pneumatic pressure agent (50, 51, 53, 57 ; 153 ; 253) so as to put said braking piston (8) in service braking position;
actuating the venting of the parking brake pressure chamber (25) to move said blocking device (20) until the latter comes to immobilize said braking piston (8) in its service braking position, said parking brake (7) then being in working configuration;
supplying said service brake pressure chamber (13) with said second source of pneumatic pressure agent (50, 51, 54, 58 ; 154 ; 254) so as to apply an additional force on the braking linkage (4) of said system (1) via said braking piston; and;
actuating the venting of said service brake pressure chamber (13).

15. A method according to claim 14, wherein said step of actuating the venting of said parking brake pressure chamber (25) is triggered after detecting a predetermined pressure threshold and/or said step of actuating the venting of said service brake pressure chamber (13) is carried out by allowing said service brake pressure chamber to leak (13).

16. A system according to claim 3, further comprising a diverting valve (56 ; 156 ; 256) configured to be connected to said first source of pneumatic pressure agent (50, 51, 53, 57 ; 153 ; 253), to said second source of pneumatic pressure agent (50, 51, 54, 58 ; 154 ; 254) and to said service brake pressure chamber (13) for its supply.

* * * * *